United States Patent
Maalioune

(10) Patent No.: US 8,831,900 B2
(45) Date of Patent: Sep. 9, 2014

(54) SYSTEM FOR CONTROLLING AT LEAST ONE ACTUATOR FOR THRUST REVERSER COWLINGS ON A TURBOJET ENGINE AND METHOD FOR TESTING SAID SYSTEM

(75) Inventor: Hakim Maalioune, Orgeval (FR)

(73) Assignee: Aircelle, Gonfreville l'Orcher (FR)

( * ) Notice: Subject to any disclaimer, the term of this patent is extended or adjusted under 35 U.S.C. 154(b) by 259 days.

(21) Appl. No.: 12/673,823

(22) PCT Filed: Jul. 7, 2008

(86) PCT No.: PCT/FR2008/000977
§ 371 (c)(1),
(2), (4) Date: Feb. 17, 2010

(87) PCT Pub. No.: WO2009/024688
PCT Pub. Date: Feb. 26, 2009

(65) Prior Publication Data
US 2011/0022345 A1    Jan. 27, 2011

(30) Foreign Application Priority Data
Aug. 20, 2007 (FR) ...................... 07 05924

(51) Int. Cl.
*G01D 3/00* (2006.01)
*F02K 1/76* (2006.01)
*F02K 1/72* (2006.01)
*G05B 23/02* (2006.01)

(52) U.S. Cl.
CPC ............... *F02K 1/72* (2013.01); *F05D 2260/80* (2013.01); *F02K 1/766* (2013.01); *G05B 23/0256* (2013.01); *Y02T 50/671* (2013.01); *F02K 1/763* (2013.01)

USPC ............................ 702/108; 702/115; 702/117

(58) Field of Classification Search
CPC .......... F02K 1/76; G05B 23/02; G01D 3/036; B64F 5/0045; Y02T 50/671
USPC .......................................... 702/108, 115, 117
See application file for complete search history.

(56) References Cited

U.S. PATENT DOCUMENTS 3,046,730 A * 7/1962 Petren ...................... 239/265.39
3,279,182 A * 10/1966 Helmintoller ................ 60/226.2
(Continued)

FOREIGN PATENT DOCUMENTS

EP    0843089 A1    5/1998
EP    1215118 A1    6/2002

OTHER PUBLICATIONS

International Search Report PCT/FR2008/000977; Dated Feb. 18, 2009.

*Primary Examiner* — Mischita Henson
(74) *Attorney, Agent, or Firm* — Brinks Gilson & Lione

(57) ABSTRACT

The invention relates to a system for controlling at least one actuator (6) for thrust reverser cowlings (2) on a turbojet engine, comprising a set of actuator and/or control components with at least one actuator (6) for cowlings (2) driven by at least one electric motor (7) and control means (9) for the electric motor (7). The control means (9) comprise test means (20), with an interface (22) destined for receiving test requests from a user. The test means (20) are designed on reception of a test request to carry out a test cycle on one or more components (7, 6, 15, 18) of the system comprising an isolated actuation to the component(s) (7, 6, 15, 18) with regard to the other components of the system.

12 Claims, 3 Drawing Sheets

(56) References Cited

U.S. PATENT DOCUMENTS

| | | |
|---|---|---|
| 4,782,292 A | 11/1988 | Gilfoy |
| 4,850,318 A * | 7/1989 | Torigai et al. ............... 123/352 |
| 5,337,262 A * | 8/1994 | Luthi et al. .................... 702/83 |
| 5,638,383 A | 6/1997 | Wotzak |
| 5,960,626 A * | 10/1999 | Baudu et al. ................. 60/226.2 |
| 7,946,106 B2 * | 5/2011 | Dehu et al. .................. 60/226.2 |
| 7,954,759 B2 * | 6/2011 | Marin Martinod ....... 244/110 B |
| 8,285,467 B2 * | 10/2012 | Maalioune ..................... 701/100 |

\* cited by examiner

SYSTEM FOR CONTROLLING AT LEAST ONE ACTUATOR FOR THRUST REVERSER COWLINGS ON A TURBOJET ENGINE AND METHOD FOR TESTING SAID SYSTEM

TECHNICAL FIELD

The present invention relates to a system for controlling at least one actuator of cowlings of a thrust reverser for a turbojet engine and to a method for testing such a system.

BACKGROUND

The role of a thrust reverser when an airplane comes in to land is to improve the ability of an airplane to brake by redirecting forward at least some of the thrust generated by the turbojet engine. During this phase, the reverser blocks off the gas jet pipe nozzle and directs the stream ejected from the engine toward the front of the nacelle, thereby generating a reverse thrust which adds to the braking of the airplane wheels.

The means employed to achieve this reorientation of the flow vary according to the type of reverser. However, in all cases, the structure of a reverser comprises movable cowlings that can be moved between, on the one hand, a deployed position in which they open up within the nacelle a passage intended for the deflected flow and, on the other hand, a retracted position in which they close off this passage. These moving cowlings may also perform a deflecting function or may simply activate other deflecting means.

In cascade-type thrust reversers, for example, the moving cowlings slide along the rails so that by moving back during the opening phase, they uncover cascades of deflection vanes located within the thickness of the nacelle. A system of link rods connects this moving cowling to blocking doors which deploy into the ejection duct and block the exit as a direct flow. In door-type reversers on the other hand, each moving cowling pivots so that it blocks the flow and deflects it and therefore takes an active part in this reorientation.

In general, these moving cowlings are actuated by hydraulic or pneumatic actuating cylinders which require a network for transporting any pressurized fluid. This pressurized fluid is conventionally obtained either by bleeding off the turbojet engine, in the case of a pneumatic system, or by tapping off the hydraulic circuit of the airplane. Such systems require significant maintenance because the smallest leak in the hydraulic or pneumatic network will be difficult to detect and carries the risk of having consequences that are damaging both to the reverser and to other parts of the nacelle. Furthermore, because of the small amount of space available in the forward section of the reverser, installing and protecting such a circuit are particularly tricky and cumbersome.

To alleviate the various disadvantages associated with the pneumatic and hydraulic systems, thrust reverser manufacturers have sought to replace them and to fit as many as possible of their reversers with electromechanical actuators which are more lightweight and more reliable. A thrust reverser such as this is described in document EP 0 843 089.

However, electromechanical actuators also have a number of disadvantages that need to be overcome in order to take full advantage of the benefits they provide in terms of weight saving and smaller size.

In particular, electromechanical actuators entail the use of a complete electrical and mechanical control system comprising the actuators, power and control components, and sensors, it being possible for all of these components to exhibit failures.

It is standard practice, when replacing one of the components or part of a component, or even in the event of a presumed failure of a component, to carry out checks of the operation of the actuator.

One or more deployments of the thrust reverser is or are then carried out in order to check the behavior of the component, by observing whether its operation has any influence on the overall operation of the system for controlling the thrust reverser actuator.

This type of check leads to overall wear of the actuator control system and entails carrying out actuator deployment cycles which demand compliance with specific safety criteria.

BRIEF SUMMARY

The disclosure seeks to simplify the system checks and to limit the overall system wear caused by these checks.

To this end, the invention provides a system for controlling at least one actuator of cowlings of a thrust reverser for a turbojet engine comprising a set of actuating and/or checking components comprising at least: at least one cowling actuator driven by at least an electric motor, and control means for controlling the actuator and the electric motor, characterized in that the control means comprise test means comprising an interface intended to receive test requests originating from a user, and in that the test means are designed such that, upon receipt of a test request, they carry out a test cycle on one or more components of the system, comprising actuating the component or components in isolation from the other components of the system.

Thanks to the provisions of the invention, there is no longer any need to carry out full deployment cycles in order to check each component individually. These arrangements make it possible to reduce the overall device wear due to the checks, because only the component or components to be tested are actuated. In addition, the system allows interaction with a user in order to carry out the tests.

These arrangements also make it possible to set preventive maintenance procedures in place by carrying out tests on specific components after a given number of flying hours, possibly under conditions that differ from those of their normal use, in order to detect a probability of forthcoming component malfunctioning.

Advantageously, the interface of the test means is connected by communication means to the aircraft control system.

These arrangements make is possible for the aircraft control system user interface to be used in order to command the tests.

According to one embodiment, the test means are designed to carry out a test cycle repeatedly on a component of the system.

These arrangements in particular make it possible to reveal failures which would not always manifest themselves each time a component was used. By increasing the number of occurrences in which a component is used in multiple test cycles, the probability of detecting the failure increases.

Advantageously, the test means are designed so that the commanded actions on a component during a test cycle return the component to its initial state at the end of the test cycle.

These arrangements make carrying out repetitive test cycles easier.

According to one embodiment, the test means are designed, when carrying out a test cycle, to operate a component using a power value lower than that used in normal operation.

These arrangements make it possible to limit the wear on the component tested, while at the same time functionally carrying out the same operations as in normal operation.

Advantageously, the test means are arranged so that a component is operated using the same part of the control means during a test cycle as during normal operation.

These arrangements allow a test cycle to be carried out under conditions representative of normal operation of the component.

According to one embodiment, the system comprises a cowling latch, and a test cycle corresponds to an opening then a closing of the latch.

According to one embodiment, the system comprises a motor brake, and a test cycle involves activating and deactivating the motor brake.

Advantageously, the test means comprise a set of program instructions executed by the control means.

These arrangements allow the same microcontroller to be used for the tests and for normal operation, making it possible to check the operation of this element.

According to one embodiment, the system comprises at least one sensor of a parameter representative of the functioning of a component, and the result of a test cycle is obtained by analyzing the signal supplied by the sensor.

These arrangements make it possible to obtain, at the test means, a diagnosis of a possible failure, without having to add additional sensors to the component that is to be tested.

The present invention also relates to a method for testing a system for controlling at least one actuator of cowlings of a thrust reverser for a turbojet engine, comprising receiving, from a user, a request to carry out a test on a component, and carrying out a command to actuate one or more components of a control system of the thrust reverser in isolation from the other components of the system.

Advantageously, the step of commanding an action is carried out repetitively.

According to one embodiment, the commanded action on a tested component is carried out using a power value lower than that used in normal operation.

BRIEF DESCRIPTION OF THE DRAWINGS

In any event, the invention will be clearly understood with the aid of the description which follows, with reference to the attached schematic drawing which, by way of non-limiting example, depicts one embodiment of this system.

DETAILED DESCRIPTION

Before describing one embodiment of the invention in detail, it is important to emphasize that the method and system described are not limited to one type of thrust reverser in particular. Although illustrated in the form of a cascade-type thrust reverser, the invention may be implemented with thrust reversers of different designs, particularly of the doors design.

Figure 1:
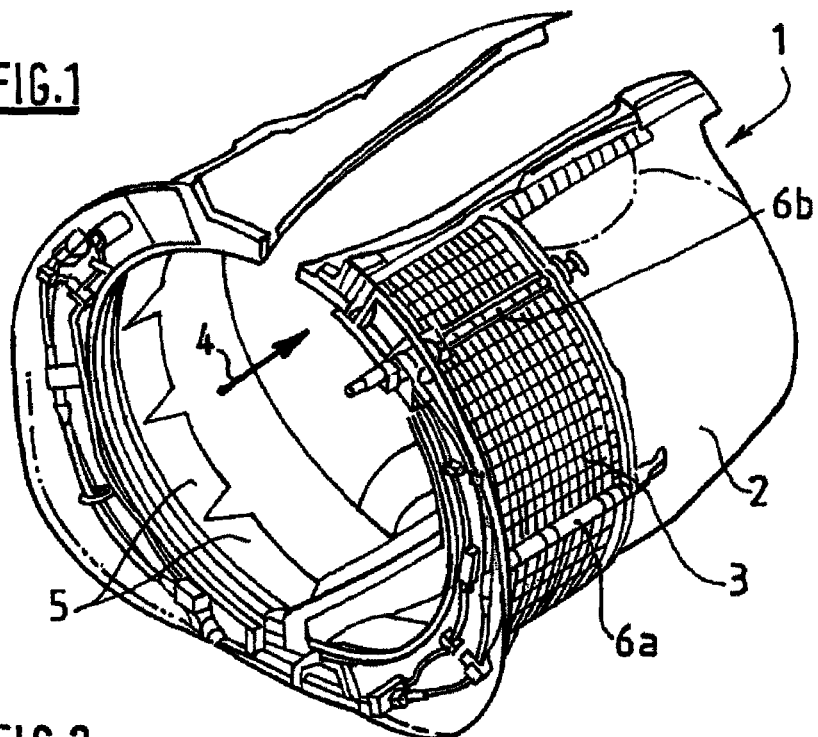
FIG. 1 is a partial and perspective schematic view of a nacelle incorporating a cascade-type thrust reverser.

FIG. 1 shows a partial schematic view of a nacelle incorporating a thrust reverser 1. The turbojet engine is not depicted. This thrust reverser 1 has a structure comprising two semicircular moving cowlings 2 able to slide to uncover cascades 3 of deflection vanes positioned between the moving cowlings 2 and a passage cross section for the airflow 4 that is to be deflected. Blocking doors 5 are positioned inside the structure so that they can pivot and move from a position in which they do not impede the passage of the airflow 4 into a position in which they block this passage. To coordinate the opening of the moving cowlings 2 with a closing-off position of the blocking doors 5, the latter are mechanically linked to the moving cowling 2 by hinges and to the fixed structure by a system of linkages (not depicted).

The movement of the moving cowlings 2 along the outside of the structure is afforded by a set of actuating cylinders 6a, 6b which are mounted on a forward section inside which are housed an electric motor 7 and flexible transmission shafts 8a, 8b connected respectively to the actuating cylinders 6a, 6b in order to actuate them.

Figure 2:
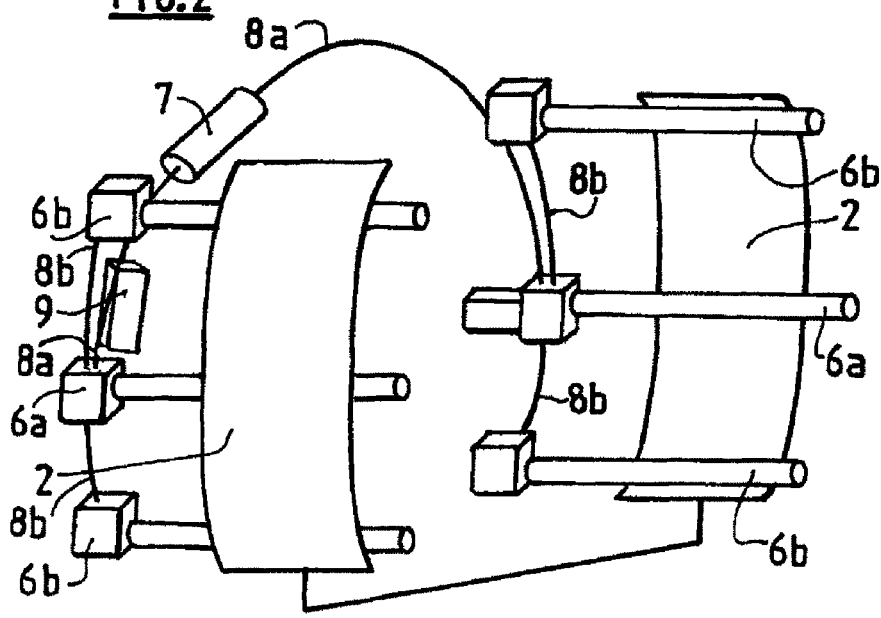
FIG. 2 is a schematic depiction of the moving cowlings and of their actuating system.

The system for actuating the moving cowlings 2 is depicted in isolation in FIG. 2. Each moving cowling 2 may undergo a translational movement under the action of three actuating cylinders 6a, 6b, comprising a central actuating cylinder 6a and two additional actuating cylinders 6b actuated by a single electric motor 7 connected to control means 9 comprising a microcontroller. The power delivered by the electric motor 7 is first of all distributed to the central actuating cylinders 6a via two flexible transmission shafts 8a, then to the additional actuating cylinders 6b via flexible transmission shafts 8b.

According to an alternative form that has not been depicted, only two top and bottom actuating cylinders are used for each cowling, these being actuated by a single electric motor connected to a control interface. The power delivered by the electric motor is distributed to the two top and bottom actuating cylinders via two flexible transmission shafts 8a.

Figure 3:
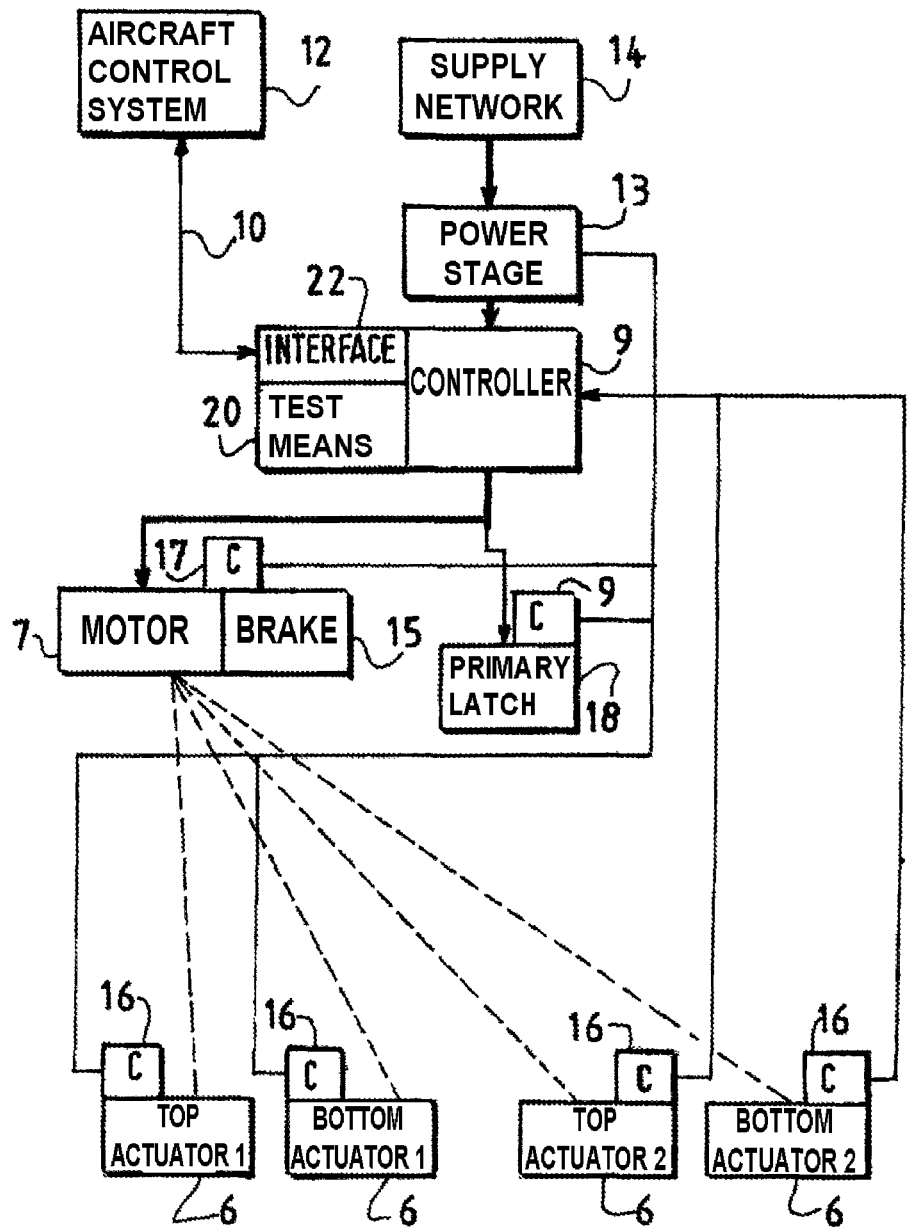
FIG. 3 is a schematic depiction of the control system used to control the actuators of the moving cowlings.

FIG. 3 schematically shows a system for controlling the actuation of two cowlings with two top and bottom actuators for each cowling.

As has been depicted in FIG. 3, a system for controlling the actuators of a thrust reverser according to the invention comprises control means comprising a microcontroller 9.

This microcontroller is connected by communication means 10 to the aircraft control system 12.

The control system also comprises a power stage 13 connected to the aircraft supply network 14.

The microcontroller 9 allows an electric motor 7 and actuating cylinders or actuators 6 to be controlled, as described earlier. The motor also comprises a brake 15, likewise controlled by the microcontroller 9.

Some of the actuators 6 are equipped with position sensors 16 so as to determine the movement of the actuator 6 between the open and closed position. Likewise, the motor and/or the brake are equipped with position sensors 17 which likewise allow the direction in which the actuators 6, and therefore the cowlings 2, are moving to be determined.

The microcontroller 9 also controls the opening and closing of a cowling latch 18, known as the primary latch. This latch prevents undesired opening of the cowling 2. This latch 18 is associated with a proximity sensor 19 that indicates the position of the moving part of the latch 18.

The microcontroller 9 comprises test means 20 for performing tests on at least some of the components of the system, an interface 22 between the test means and the communication means 10, the test means 20 being designed to carry out a test cycle on a component at the request of the aircraft control system, operated by a user.

The test means 20 are designed to carry out a test action/cycle repeatedly on a component of the system, according to the parameters of the test cycle, returning the component to its initial state at the end of the test cycle so as to allow this test to be carried out in a loop without damaging other components of the system.

During a test cycle, a component is operated with a power value lower than that used in normal operation, the operation being performed using the same part of the control means 9.

A first example of a test may be carried out in relation to a primary latch 18. Each test cycle corresponds to an opening then a closing of the latch 18. This latch 18 comprises a coil intended to create a magnetic field in order to drive a moving part of the latch 18. It is possible, by commanding successive cycles of energizing the coil, to check the opening and closing of the latch 18. The opening and the closing of the latch are checked by checking a signal from the proximity sensor 19.

Hence, the result of a test cycle is obtained by analyzing the signal supplied by a sensor 19 of a parameter representative of the functioning of a component.

A second example of a test relates to the brake 15 of the motor 7. In this case, each test cycle comprises activating and deactivating the motor brake 15.

Figure 4:
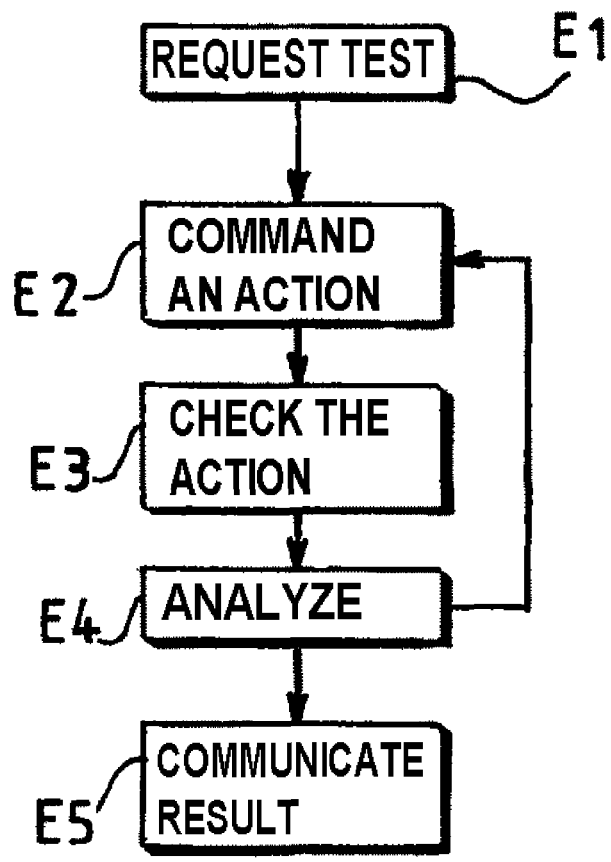
FIG. 4 is a flow diagram of a method according to the invention.

A diagram summarizing the steps of a method for controlling at least one actuator of cowlings of a thrust reverser according to the invention is given in FIG. 4.

This method comprises a first step E1 which comprises receiving a request to carry out a test on a component, originating from the aircraft control system.

In a second step E2, the test means 20 command an action on a component of the thrust reverser control system or a sub-part of the system comprising a set of components. For preference, the commanded action on a tested component is carried out using a power value lower than that used in normal operation.

In a third step E3, the results of the test are checked, for example using a sensor 19, as described previously.

In a fourth step E4, the results of the test are analyzed by the test means 20 in order to identify any failure there might be.

It should be noted that steps E2 to E4 can be carried out repeatedly with a view to detecting failures which do not always manifest themselves systematically.

In a fifth step E5, the results of the test are communicated to the aircraft control system 12 via the interface 22 and the communication means 20.

It should be noted that the control method described hereinabove may be programmed into the computer using software means. Hence, the test means 20 comprise a set of program instructions executed by the control means.

As goes without saying, the invention is not restricted only to the embodiment of the system that has been described hereinabove by way of example, but on the contrary encompasses all variants thereof.

The invention claimed is:

1. A system for controlling at least one actuator of cowlings of a thrust reverser for a turbojet engine of an aircraft comprising a set of actuating and/or checking components, the system comprising:
    at least one cowling actuator driven by at least an electric motor; and
    control means for controlling the actuator and the electric motor,
    wherein the control means comprise:
        test means; and
        an interface connected to the test means, said interface being connected directly to an aircraft control system of the aircraft via a communication means, and said interface receiving test requests directly from the aircraft control system of the aircraft, and said interface communicating the test requests to the test means,
    wherein upon receipt of the test requests by the interface, the test means carry out a test cycle on one or more components of the system, said test cycle comprising actuating the component or components in isolation from other components of the system for controlling the at least one actuator of cowlings of the thrust reverser for the turbojet engine and checking the results of the test, said results being communicated through the interface to a user.

2. The system as claimed in claim 1, wherein the test means are designed to carry out the test cycle repeatedly on a component of the system.

3. The system as claimed in claim 1, wherein the test means are designed so that commanded actions on a component during the test cycle return the component to an initial state at the end of the test cycle.

4. The system as claimed in claim 1, wherein the test means are designed, when carrying out the test cycle, to operate a component using a power value lower than that used in normal operation.

5. The system as claimed in claim 1, wherein the test means are arranged so that a component is operated using the same part of the control means during the test cycle as during normal operation.

6. The system as claimed in claim 1, further comprising a cowling latch wherein the test cycle corresponds to an opening then a closing of the latch.

7. The system as claimed in claim 1, comprising a motor brake wherein the test cycle involves activating and deactivating the motor brake.

8. The system as claimed in claim 1, wherein the test means comprise a set of program instructions executed by the control means.

9. The system as claimed in claim 1, further comprising at least one sensor of a parameter representative of a functioning of a component, wherein a result of the test cycle is obtained by analyzing a signal supplied by the sensor.

10. A method for testing a system for controlling at least one actuator of cowlings of a thrust reverser for a turbojet engine of an aircraft, the method comprising:
    receiving, on an interface of test means of control means of the system for controlling the at least one actuator of cowlings of the thrust reverser, a test request from an aircraft control system of the aircraft, said interface of the test means connected directly to the aircraft control system via communication means;
    transmitting the test request to the test means to carry out a test cycle on at least one component of the system for controlling the at least one actuator of cowlings of the thrust reverser; and
    carrying out a command to actuate the at least one component in isolation from other components of the system for controlling the at least one actuator of cowlings of the thrust reverser using the test means of the control means.

11. The control method as claimed in claim 10, wherein said commanding an action is carried out repetitively.

12. The control method as claimed in claim 10, wherein the commanded action on a tested component is carried out using a power value lower than that used in normal operation.

* * * * *